US012798120B2

(12) United States Patent
Ilgenfritz et al.

(10) Patent No.: US 12,798,120 B2
(45) Date of Patent: Nov. 17, 2026

(54) GRIPPING DEVICE AND SYSTEM COMPRISING A GRIPPING DEVICE

(71) Applicant: Syntegon Technology GmbH, Waiblingen (DE)

(72) Inventors: Markus Ilgenfritz, Feuchtwangen (DE); Ulrich Krauß, Ilshofen (DE); Stefan Nagler, Unterschneidheim (DE); Samuel Stegmeier, Wüstenau (DE)

(73) Assignee: Syntegon Technology GmbH, Waiblingen (DE)

(*) Notice: Subject to any disclaimer, the term of this patent is extended or adjusted under 35 U.S.C. 154(b) by 563 days.

(21) Appl. No.: 18/563,032

(22) PCT Filed: May 11, 2022

(86) PCT No.: PCT/EP2022/062802
§ 371 (c)(1),
(2) Date: Nov. 21, 2023

(87) PCT Pub. No.: WO2022/248226
PCT Pub. Date: Dec. 1, 2022

(65) Prior Publication Data

US 2024/0261984 A1 Aug. 8, 2024

(30) Foreign Application Priority Data

May 26, 2021 (DE) ..................... 10 2021 113 553.2

(51) Int. Cl.
*B25J 15/04* (2006.01)

(52) U.S. Cl.
CPC ................................ *B25J 15/0475* (2013.01)

(58) Field of Classification Search
CPC ................ B25J 15/0052; B25J 15/0061; B25J 15/0066; B25J 15/0253; B25J 15/026;
(Continued)

(56) References Cited

U.S. PATENT DOCUMENTS 4,620,362 A 11/1986 Reynolds
4,676,541 A 6/1987 Lord et al.
(Continued)

FOREIGN PATENT DOCUMENTS

CN 109623862 A * 4/2019 .......... B25J 15/0475
CN 109986591 A * 7/2019 ............ B25J 15/086
(Continued)

OTHER PUBLICATIONS

International Search Report for Application No. PCT/EP2022/062802 dated for May 11, 2022. (8 pages including English translation).

(Continued)

*Primary Examiner* — Joshua E Rodden
(74) *Attorney, Agent, or Firm* — Michael Best & Friedrich LLP

(57) ABSTRACT

A gripping device includes a main body which can be coupled to a robot, at least one adapter portion which is movable on the main body along a gripping axis, and at least one gripping element which can be detachably locked to the adapter portion, wherein the adapter portion includes a locking mechanism having at least one locking element which, in a locking position, locks the gripping element to the adapter portion, wherein an unlocking element is arranged on the main body, and wherein the locking mechanism can be moved along the gripping axis into an unlocking position in which the unlocking element transfers the locking element from its locking position into a release position in which the gripping element can be detached from the adapter portion.

19 Claims, 7 Drawing Sheets

(58) Field of Classification Search
CPC .. B25J 15/0266; B25J 15/0273; B25J 15/028; B25J 15/0286; B25J 15/0293; B25J 15/04; B25J 15/0408; B25J 15/0433; B25J 15/0466; B25J 15/0475; B25J 15/0491; B25J 15/08; B25J 15/083; B25J 15/086; B25J 15/10; B25J 15/103; B25J 15/106; B25J 15/12
USPC .......................................................... 294/106
See application file for complete search history.

(56) References Cited

U.S. PATENT DOCUMENTS

| | | | | | |
|---|---|---|---|---|---|
| 4,699,414 | A * | 10/1987 | Jones | B25J 15/026 | 294/902 |
| 4,715,636 | A | 12/1987 | Wiesner et al. | | |
| 8,602,470 | B2 * | 12/2013 | Bieler | B25J 15/0475 | 294/207 |
| 9,401,300 | B1 | 7/2016 | Choy et al. | | |
| 10,568,250 | B2 * | 2/2020 | Watanabe | H05K 13/0408 | |
| 10,682,771 | B2 * | 6/2020 | Ogata | B25J 17/0258 | |
| 12,083,668 | B2 * | 9/2024 | Hara | B25J 15/083 | |
| 2003/0189349 | A1 * | 10/2003 | Risle | B25J 15/0253 | 294/207 |
| 2008/0181757 | A1 | 7/2008 | Wheeler et al. | | |
| 2013/0154293 | A1 * | 6/2013 | De Koning | B25J 15/02 | 901/36 |
| 2013/0245823 | A1 * | 9/2013 | Kimura | B25J 9/1682 | 294/213 |
| 2016/0221196 | A1 * | 8/2016 | Suzuki | B25J 15/0425 | |
| 2019/0111575 | A1 | 4/2019 | Asano et al. | | |
| 2022/0234219 | A1 * | 7/2022 | Volk | B25J 15/0475 | |
| 2022/0297313 | A1 | 9/2022 | Balsells Mercade et al. | | |
| 2023/0065554 | A1 * | 3/2023 | Kim | B25J 15/0475 | |
| 2023/0075011 | A1 * | 3/2023 | Kim | B25J 15/0253 | |
| 2023/0390947 | A1 * | 12/2023 | Silbert | B25J 15/08 | |

FOREIGN PATENT DOCUMENTS

| | | | | |
|---|---|---|---|---|
| DE | 226826 | A1 | 9/1985 | |
| DE | 8706525 | U1 | 7/1987 | |
| DE | 3715140 | A * | 11/1988 | B25J 15/0253 |
| DE | 252343 | B1 | 6/1989 | |
| DE | 3705884 | A1 | 9/1989 | |
| DE | 19734832 | C1 * | 10/1998 | B25J 15/0475 |
| DE | 102004029051 | B3 * | 7/2005 | B25J 15/0475 |
| DE | 102006045783 | A1 | 4/2008 | |
| EP | 2664421 | A2 | 11/2013 | |
| EP | 3305479 | A2 * | 4/2018 | B25J 15/0253 |
| EP | 3305480 | A1 | 4/2018 | |
| EP | 3738721 | A1 | 11/2020 | |
| JP | 5365156 | B2 | 12/2013 | |

OTHER PUBLICATIONS

German Office Action for Application No. 102021113553.2 dated for Mar. 17, 2022. (22 pages including English translation).

* cited by examiner

GRIPPING DEVICE AND SYSTEM COMPRISING A GRIPPING DEVICE

BACKGROUND

A gripping apparatus according to U.S. Pat. No. 4,676,641 A is known.

For example, DE 10 2006 045 783 A1 discloses a gripping apparatus which is used in conjunction with a robot to handle objects in a product environment in an automated, rapid and precise manner. The objects are, for example, containers or workpieces. The gripping apparatus which is known from DE 10 2006 045 783 A1 has two carriages which are movably arranged on a housing and which each carry a gripping element. The gripping elements are secured to the carriages via respective screw connections.

EP 3 305 480 A1 discloses an additional gripping apparatus having a base member and having two carriages which are supported on the base member. The carriages are connected to a quick-clamping adapter. The quick-clamping adapters each have a mechanical interface, to which a gripping element can be secured in a releasable manner. The mechanical interface comprises a clamping spindle which is screwed to the base member.

The above-mentioned gripping apparatuses which are known from the prior art allow, where necessary, for a specific type of object, suitable first gripping elements to be exchanged for second gripping elements which are suitable for another type of object. For such an exchange, however, it is necessary for a manual intervention to be carried out by an operator who has to release screw connections in order to remove first gripping elements. The screw connections then have to be manually actuated again in order to fix second gripping elements again. These operations increase the auxiliary times in an automated production environment.

SUMMARY

On this basis, an object of the present invention is to provide a gripping apparatus which allows a rapid and simple change of a gripping element.

This object is achieved in a gripping apparatus according to the disclosure.

The unlocking element is particularly arranged in a non-movable manner on the base member and moves in any case with the base member, therefore follows a handling movement of a robot, on which the base member is generally fixed. The locking device is, however, movable relative to the base member and the unlocking element along the gripping axis into an unlocking position. In this unlocking position, the unlocking element moves the locking element out of the locking position thereof into a release position, in which the gripping element can be released from the adapter portion. In this manner, by moving the adapter portion and the locking device along the gripping axis, the locking device can be actuated; an external actuation of the locking device is unnecessary. The gripping apparatus according to the invention consequently supports a rapid change of a gripping element and allows a rapid adaptation of the gripping apparatus to different types of objects.

The gripping apparatus according to the invention is particularly advantageous in an aseptic production environment, in which manual, potentially contaminating interventions by operators are intended to be avoided where possible. In particular, the aseptic production environment is an isolator, more preferably a gloveless isolator.

Preferably, the at least one gripping element of the gripping apparatus is constructed for handling objects which are in the form of troughs, tubs, vials, sprays or cartridges. For example, troughs or tubs can be removed from a storage container with a first gripping element. The troughs or tubs contain, for example, vials, sprays or cartridges. After the gripping element is changed on the gripping apparatus, individual vials, sprays or cartridges can then be gripped.

Preferably, the gripping apparatus has a drive unit for driving the at least one adapter portion along the gripping axis in such a manner that the locking device can be moved into the unlocking position. The drive unit brings the adapter portion and consequently also the locking device with the locking element thereof into a position along the gripping axis, in which the unlocking element which is fixed in position relative to the gripping axis cooperates with the locking element and moves it out of the locking position thereof into the release position.

Preferably, the gripping apparatus has only one single drive unit which drives both the adapter portion in the manner described above and the gripping element, which can be locked thereto in a releasable manner, along the gripping axis. Consequently, the same drive unit can carry out along the gripping axis gripping movements and actuation movements for moving the locking device into the unlocking position. It is thereby possible to provide a compact gripping apparatus which is constructed simply.

The drive unit is preferably in the form of an electric or pneumatic drive unit.

In an additional embodiment, the gripping apparatus has a monitoring device which monitors the location and/or position of the adapter portion and/or the location and/or position of the locking element and/or the presence of a gripping element on the adapter portion. The monitoring device is configured, for example, to monitor the position in which the adapter portion is located relative to the base member along the gripping axis and/or whether the locking element is in the locking position or the release position. Alternatively or additionally, the presence (or the absence) of a gripping element on the adapter portion is checked. In this manner, different functional states of the gripping apparatus can be monitored, for example, whether a gripping element—in the unlocking position of the locking device—is released and can be removed or whether—in all other positions of the locking device—the gripping element is securely locked to the adapter portion.

Optionally, gripping operations of objects to be gripped can also be monitored. The monitoring device has in particular a camera system and/or at least one sensor which is in the form of, for example, an inductive, optical and/or capacitive sensor.

Preferably, the gripping apparatus comprises a control device, wherein the control device is constructed to control an above-mentioned drive unit and/or an above-mentioned monitoring device. If the control device is constructed to control the drive unit, the movement of the gripping element along the gripping axis can be controlled by means of the control device, particularly for a gripping operation and/or for unlocking the gripping element.

In particular, an input device which is connected to the control device and via which an operator can directly control the gripping apparatus or an automated movement sequence of the gripping apparatus is predetermined is provided.

It is also possible for the control device to control only the monitoring device. However, it is preferable for the control device to control both the drive unit and the monitoring device. Consequently, the control device can control the drive unit and take into consideration parameters which are detected by the monitoring device. In particular, consequently, the gripping of an object and the unlocking of the gripping element can be carried out without monitoring by an operator.

In particular, an output device which is connected to the control device is provided. The output device may, for example, output a warning signal if a malfunction state of the gripping apparatus is detected, for example, an incorrect position of the gripping element or the locking element as identified by the monitoring device.

Preferably, the unlocking position of the locking device corresponds to an end or reversal position of the adapter portion along the gripping axis. The end or reversal position of the adapter portion preferably corresponds to a gripping position, which is open to the maximum extent, of the gripping element. Alternatively, the end or reversal position of the adapter portion corresponds to a gripping position, which is closed to the maximum extent, of the gripping element. In that the end or reversal positions correspond to a gripping position, which is open or closed to the maximum extent, of the gripping element, the movement path, which can be used for a gripping movement, of the gripping element is not limited or is limited only very slightly. For example, an actuation path of the adapter portion which corresponds to a change of the locking element out of the locking position into the release position is only a few millimeters, for example, from 2 to 3 mm.

In a preferred embodiment, the gripping apparatus is in the form of an external gripper with which an object to be gripped is gripped from the outside, wherein the unlocking position corresponds to an external end and reversal position and a gripping position, which is open to the maximum extent, of the gripping element.

It is preferable if the locking device comprises a pretensioning element which urges the locking element into the locking position. The pretensioning element is preferably in the form of a spring. The pretensioning element ensures that—in positions outside the unlocking position of the locking device—the locking element remains in the locking position thereof. Consequently, an unintentional release of the gripping element from the adapter portion is prevented in all the positions, which differ from the unlocking position, of the locking device.

In a preferred embodiment, the locking device has at least one stop which is arranged on the base member and which limits a movement path of the locking element. In this manner, at least one end position of the movable locking element can be defined. Such an end position preferably corresponds to the locking position or the release position.

A limitation, which is active in the locking position, of the movement path of the locking element is particularly advantageous if the locking element is pretensioned in the direction of the locking position. The limitation ensures that at least some of a pretensioning force is also still applied in the locking position.

A limitation, which is active in the release position, of the movement path of the locking element is also particularly advantageous if the locking element is pretensioned in the direction of the locking position. The limitation allows the release position of the configuration (size, geometry) of a pretensioning element to be defined.

In particular, the locking element can be moved during a movement between the locking position and the release position thereof along a movement axis which is preferably orientated parallel with the gripping axis. Consequently, the locking element can be moved together with the adapter portion and moved into the release position along the gripping axis or parallel therewith.

In a preferred embodiment, the locking element cooperates with a locking portion which is associated with the gripping element, wherein the locking element and the locking portion are connected to each other in a positive-locking manner in the locking position of the locking element, wherein the positive-locking connection is preferably active along a positive-locking axis which extends at an angle, in particular perpendicularly, to the gripping axis.

The gripping element is retained on the adapter portion—when the locking element takes up the locking position thereof—by means of the locking portion along the positive-locking axis at an angle to the gripping axis so that the gripping element is locked in a releasable manner to the adapter portion by means of the positive-locking connection. The positive-locking connection between the locking element and the locking portion is released when the locking element is moved into the release position, which is associated with the gripping element being unlocked from the adapter portion. Preferably, the positive-locking connection is constructed in such a manner that the gripping element is retained by means of the locking portion perpendicularly to the gripping axis, in particular perpendicularly to a contact plane between the gripping element and adapter portion. The positive-locking connection between the locking element and the locking portion allows a reliable retention of the gripping element in all positions differing from the unlocking position of the adapter portion.

Preferably, the gripping apparatus has at least one retention device which is independent of the locking device for retaining the at least one gripping element on the at least one adapter portion, wherein the retention device has positive-locking elements which are associated with the gripping element and the adapter portion and which are positive-locking with respect to each other along the gripping axis in the state thereof joined together.

The positive-locking elements retain the gripping element on the adapter portion—preferably both in the locking position and in the release position of the locking element—along the gripping axis so that the gripping element cannot be moved when viewed along the gripping axis relative to the adapter portion. The retention device is used to releasably retain the gripping element on the adapter portion, whereby the gripping element is prevented from falling off the adapter portion in an uncontrolled manner in a state in which the locking element takes up the release position thereof.

Preferably, the retention device is constructed in such a manner that the gripping element is guided by means of the positive-locking elements along a guiding axis on the adapter portion, wherein the guiding axis preferably extends perpendicularly to the gripping axis so that the gripping element can be removed in a direction perpendicular to the gripping axis from the adapter portion and can be positioned on the adapter portion. Accordingly, the gripping element—in the unlocking position of the adapter portion—can be released from the adapter portion and can be handled by means of a handling device, for example, a robot.

In a preferred embodiment, the positive-locking elements comprise a first positive-locking element which has a receiving region for receiving a projection which is formed on or by a second positive-locking element.

The projection engages in the receiving region and retains the gripping element on the adapter portion. The gripping element is releasable from the adapter portion in the unlocking position of the adapter portion along the extent axis of the projection.

In particular, there is provision for the projection to be formed on the gripping element and for the receiving region to be formed on the adapter portion. In an alternative embodiment, the projection is formed on the adapter portion and the receiving region is formed on the gripping element. In particular, the projection is in the form of a bolt which is or can be introduced into a receiving region, which is in the form of a corresponding recess, of the first positive-locking element. Preferably, the bolt retains the gripping element when viewed along the gripping axis on the adapter portion in a positive-locking manner; in this case, the gripping element can be positioned in the direction of the extent axis of the bolt on the adapter portion and can be removed from the adapter portion.

Preferably, the adapter portion has at least one reduced pressure connection which communicates with a reduced pressure device of the gripping element. By means of the reduced pressure device and a correspondingly formed gripping element on the gripping apparatus, it is possible to grip an object or to grip it in a supported, non-positive-locking and/or positive-locking manner with reduced pressure.

In a preferred embodiment, the gripping apparatus has two gripping elements which form a gripping element pair, wherein the gripping elements can preferably be releasably locked to respective adapter portions of the base member and the gripping elements can be moved along the gripping axis in mutually opposite directions, in particular driven.

With two gripping elements which can be moved along the gripping axis in mutually opposite directions, an object can be gripped from two sides. Furthermore, the movement of the adapter portions along the gripping axis in respective unlocking positions is possible with unlocking elements which are arranged symmetrically relative to each other, preferably with simultaneous unlocking of the two gripping elements. The gripping with two gripping elements allows a precise and centered gripping of an object from two sides. The object is prevented from tipping. In this case, the gripping apparatus can be in the form of an internal gripper or external gripper. The gripping element pair is particularly constructed to grip an object in a positive-locking and/or non-positive-locking manner.

The invention further relates to a system which comprises a gripping apparatus which is described above and which has a first gripping element pair, furthermore a second gripping element pair, a store and a robot, wherein the base member of the gripping apparatus is arranged on an active region of the robot, and wherein optionally the first gripping element pair or the second gripping element pair is or can be releasably locked to the adapter portions of the base member and wherein the other gripping element pair is or can be stored in the store.

Accordingly, either the first gripping element pair, the second gripping element pair or neither of the gripping element pairs is locked to the adapter portions of the base member. The robot allows a movement of a gripping element pair coupled to an object to be gripped. After the object has been gripped, the robot can bring the gripped object into another position or location by means of the coupled gripping element pair.

The system according to the invention allows automatic unlocking of a first gripping element pair which is locked to the adapter portions. Furthermore, by means of the robot an automated deposit of an unlocked gripping element pair in the store is possible; and a releasably lockable receiving of the second gripping element pair to the adapter portion is possible.

In an advantageous manner, the system allows an automated change between the first and second gripping element pair. The automated change between different gripping element pairs allows a flexible and efficient use of the system in an automated production environment. In particular, objects of different sizes and shapes can be gripped. Preferably, additional gripping element pairs are stored in the store in accordance with the intended application.

Preferably, the store has storage portions which are each constructed to store a gripping element pair. Removing a first gripping element pair from the adapter portions of the gripping apparatus and joining the adapter portions to a second gripping element pair is preferably carried out in the unlocking position of the locking device so that the locking element remains in the release position thereof during the exchange of the gripping element pairs.

In a preferred embodiment, in a state of a gripping element pair stored on one of the storage portions, this gripping element pair is retained in or on the store in a positive-locking manner. The store and the gripping elements have corresponding positive-locking elements. The positive-locking retention of the gripping element pair allows a gripping element pair to be deposited selectively and received in a positionally accurate manner.

BRIEF DESCRIPTION OF THE DRAWINGS

Additional features and advantages of the invention are set out in the following description and the illustration of a preferred exemplary embodiment with drawings. In the drawings.

DETAILED DESCRIPTION

Figure 1:
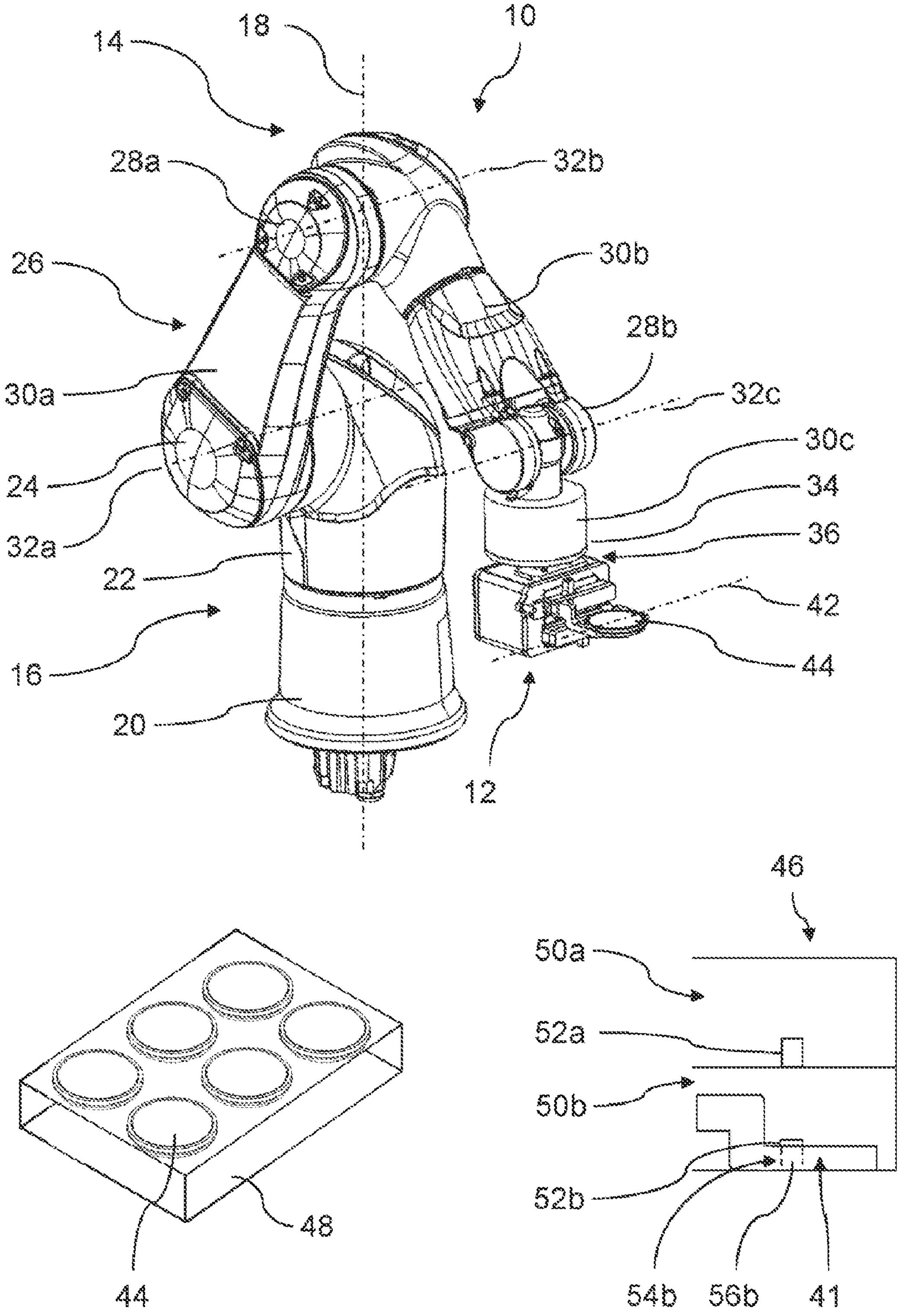
FIG. 1 shows a perspective view of a system having a gripping apparatus.

FIG. 1 illustrates a system which is generally designated 10. The system 10 comprises a gripping apparatus 12 and a robot 14 which preferably has a plurality of degrees of freedom of movement. The system 10 is arranged, for example, in an aseptic production environment.

A preferably fixed frame 16 of the robot 14 has a frame axis 18 which is preferably orientated vertically. The frame 16 is configured in two pieces. A first frame member 20 which is secured, for example, to a retention member (not illustrated) or an underlying surface of the production environment is non-movable. The first frame member 20 forms a base of the robot 14. A second frame member 22 which is arranged along the frame axis 18 adjacent to the first frame member 20 is rotatable about the frame axis 18 and relative to the first frame member 20. The second frame member 22 forms a shoulder of the robot 14, wherein the frame axis 18 forms the first axis of preferably six axes of the robot 14.

The robot 14 has a robot arm 26 which is articulated to the second frame member 22 in a movable manner via a first articulation 24. The robot arm 26 has three arm portions 30*a*, 30*b*, 30*c* which are connected to each other in an articulated manner via intermediate articulations 28*a*, 28*b*. Articulation rotation axes 32*a*, 32*b*, 32*c* which are associated with the first articulation 24 and the intermediate articulations 28*a*, 28*b* preferably extend transversely, in particular perpendicularly, to the frame axis 18.

The robot arm 26 has an end 34, which faces away from the frame 16 and on which an active region 36 of the robot 14 is arranged. The gripping apparatus 12 is arranged on the active region 36.

The gripping apparatus 12 has two releasably lockable gripping elements 38 and 39. The two gripping elements 38 and 39 form a gripping element pair 40. The gripping elements 38 and 39 are movable in mutually opposite directions, along a gripping axis 42. The gripping axis 42 is orientated, for example, orthogonally to the frame axis 18.

The multi-articulation robot 14 allows the gripping apparatus 12 to be brought inside the production environment into any position and orientation. In the embodiment illustrated in the drawings, the gripping apparatus 12 has gripping elements 38 and 39 which are constructed to grip a petri-dish-like object 44. A gripping movement of the gripping elements 38 and 39 is carried out along the gripping axis 42. As soon as the gripping elements 38 and 39 have gripped the object 44, the robot 14 can handle the object 44 together with the gripping apparatus 12.

The system 10 further has a store 46 and a storage container 48 with objects 44 which can be removed therefrom. The store 46 and the storage container 48 are arranged within handling range of the robot 14.

The store 46 preferably has at least two mutually separated storage portions 50*a*, 50*b*. The storage portions 50*a*, 50*b* are each constructed to store at least one gripping element pair 40. To this end, each of the storage portions 50*a*, 50*b* has at least two, for example, bolt-like positive-locking elements 52*a*, 52*b*. Each of the gripping elements 38 and 39 of a gripping element pair 40 has positive-locking elements 54*a*, 54*b* which correspond to these positive-locking elements 52*a*, 52*b* and which, for example, are in the form of cylindrical recesses 56*a* and 56*b*. The gripping elements 38 and 39 of a gripping element pair 40 are retained with the recesses 56*a*, 56*b* thereof on the positive-locking elements 52*a*, 52*b* in a positive-locking manner and consequently stored on or in the store 46 or in one of the storage portions 50*a*, 50*b* and releasably fixed at that location.

Figure 2:
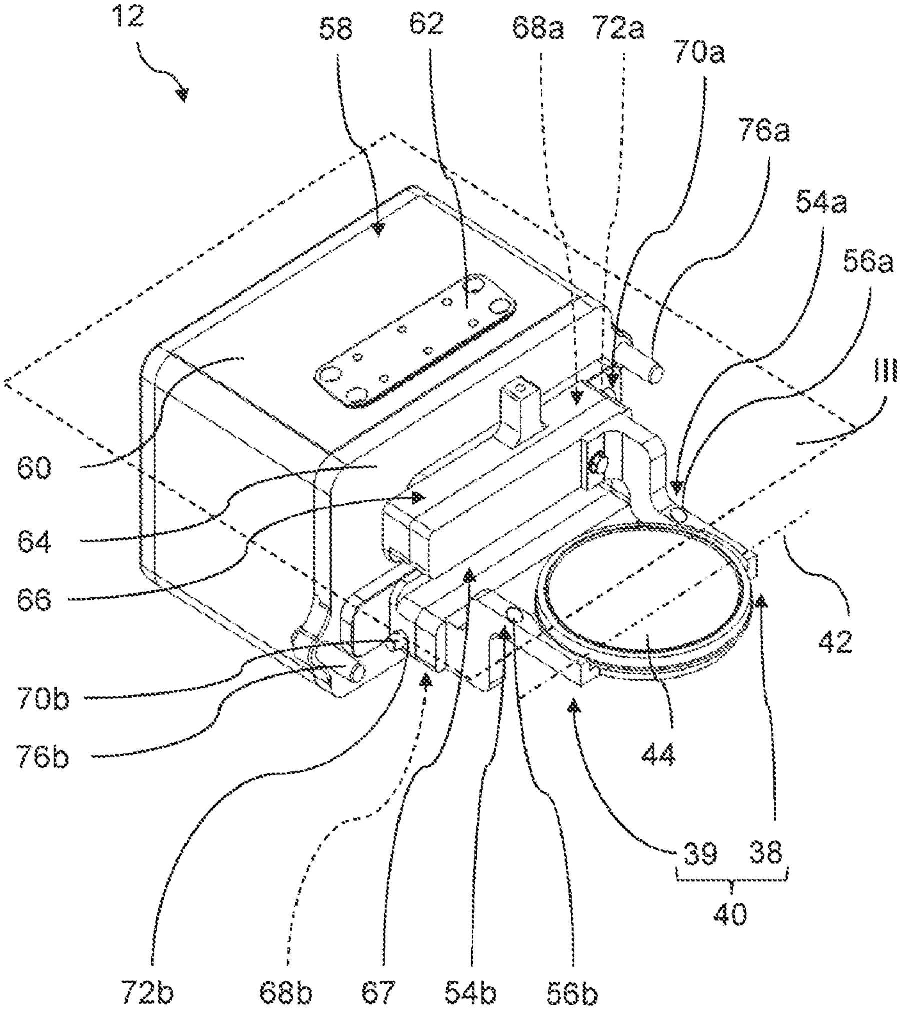
FIG. 2 shows a perspective view of the gripping apparatus according to FIG. 1.

FIG. 2 illustrates the gripping apparatus 12 of the system 10 and a gripped object 44. The gripping apparatus 12 has a block-like base member 58. At a first side 60, facing the robot 14, of the base member 58, a robot interface 62 is constructed. The base member 58 can be releasably connected to the active region 36 of the robot 14 via the robot interface 62.

Two adapter portions 66 and 67 which are stored on the base member 58 are arranged adjacent to an additional side 64 of the base member 58. The adapter portions 66 and 67 are movable in mutually opposite movement directions, which are parallel with the gripping axis 42, relative to the base member 58.

A locking device 68*a*, 68*b* is associated with each of the two adapter portions 66, 67. These locking devices 68*a*, 68*b* can be integrated in the adapter portions 66, 67 (indicated by broken lines in FIG. 2).

The locking devices 68*a*, 68*b* each have a locking element 70*a*, 70*b*. The locking elements 70*a*, 70*b* each extend parallel with the gripping axis 42, project through a respective recess 72*a*, 72*b* out of a respective adapter portion 66, 67 and are movable relative to the respective adapter portion 66, 67.

The locking elements 70*a*, 70*b* are particularly movable along a respective movement axis 74*a* and 74*b* (cf. FIG. 4*a*) which are each orientated particularly parallel with the gripping axis 42.

Each locking device 68*a*, 68*b* is used to lock a gripping element 38, 39 to one of the adapter portions 66, 67 in a releasable manner. The locking devices 68*a*, 68*b* move together with the respective adapter portion 66, 67 along the gripping axis 42.

In order to unlock a gripping element 38, 39, two unlocking elements 76*a* and 76*b* which are secured to the base member 58 are provided. The unlocking elements 76*a* and 76*b* are, for example, in the form of bolt-like stops which project into a movement space of the adapter portions 66, 67. The unlocking elements 76*a*, 76*b* project, for example, perpendicularly above the additional side 64 of the base member 58. The unlocking elements 76*a* and 76*b* move together with the base member 58 of the gripping apparatus 12 and consequently follow a handling movement of a robot 14.

Figure 3A:
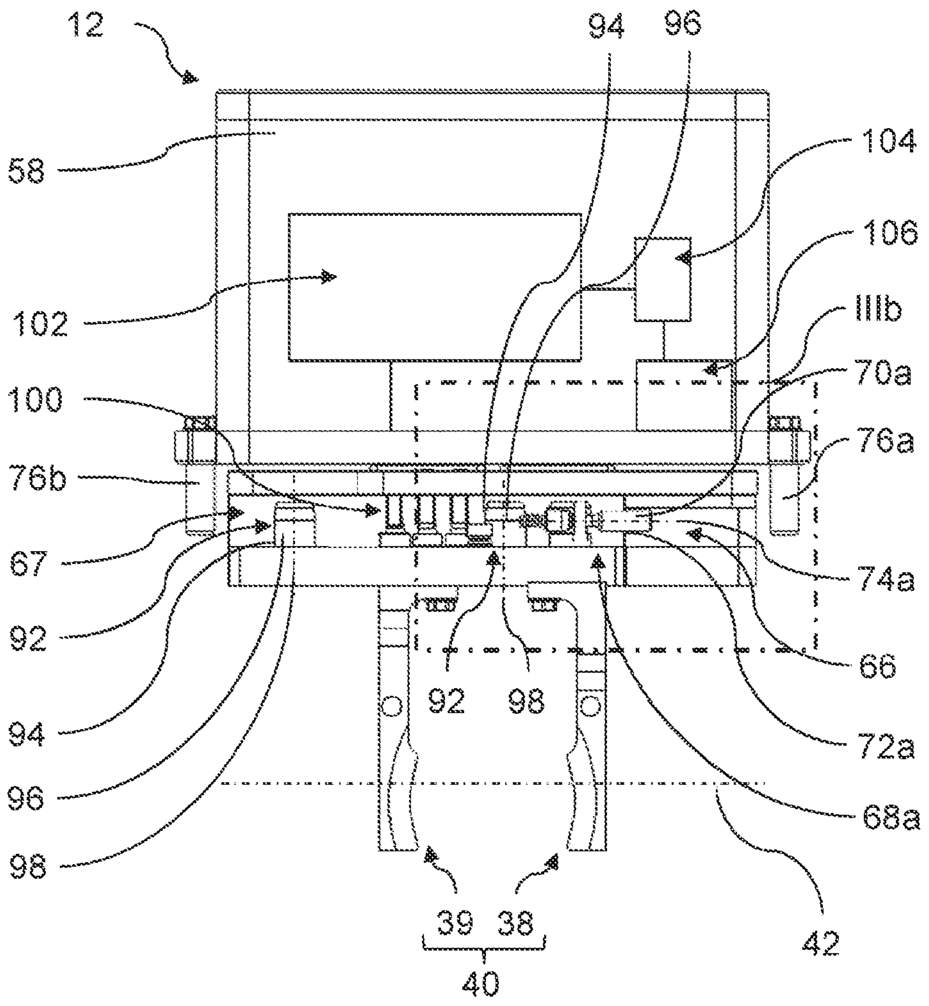
FIG. 3*a* shows a plan view of the gripping apparatus according to a plane of section denoted "III" in FIG. 2, wherein two gripping elements of the gripping apparatus are illustrated by way of example in a first gripping position.

In the state illustrated in FIG. 3*a*, for example, the gripping elements 38, 39 take up a first gripping position, wherein the gripping elements are locked to the respective adapter portions 66, 67.

Figure 3B:
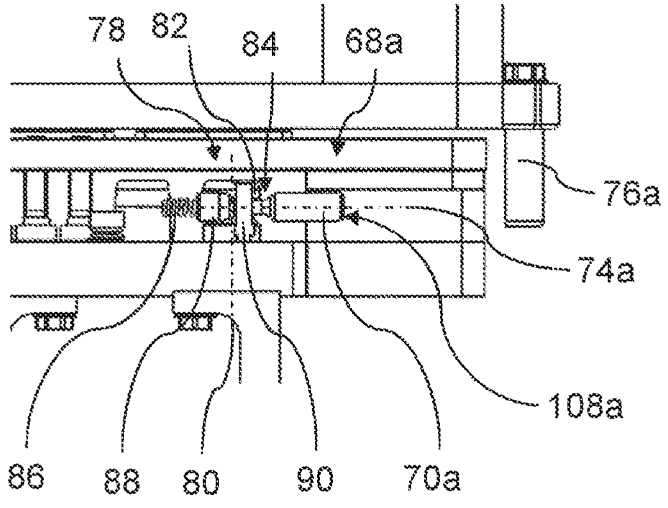
FIG. 3*b* shows a cutout, denoted IIIb in FIG. 3*a*, as an enlarged illustration.

FIGS. 3*a* and 3*b* illustrate the base member 58 and the adapter portion 66 in section. FIG. 3*b* illustrates the locking device 68*a* to an enlarged scale.

The adapter portion 67 and the locking device 68*b* have a mirror-symmetrical construction which is identical to the adapter portion 66 and the locking device 68*a*.

In the state illustrated in FIG. 3*b*, the locking element 70*a* takes up a locking position, in which the locking element 70*a* cooperates in a positive-locking manner with a locking portion 78 which is associated with the gripping element 38.

Figure 7:
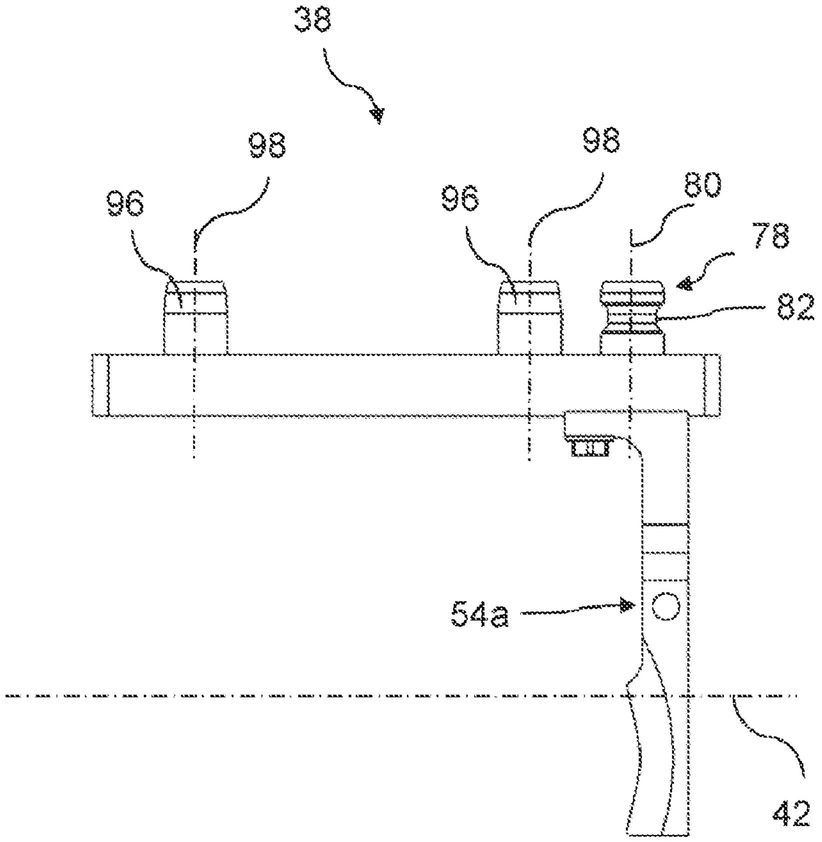
FIG. 7 shows a plan view of one of the gripping elements.

The locking portion 78 is illustrated alone in FIG. 7. The positive-locking connection of the locking element 70*a* with the locking portion 78 is preferably active along a positive-locking axis 80 which is orientated, for example, perpendicularly to the gripping axis 42. The locking portion 78 has a groove 82 which is annularly circumferential and which extends round the positive-locking axis 80.

The locking element 70*a* has a locking region 88 which is arranged at the end. In the locking position of the locking element 70*a*, this locking region 88 cooperates, when viewed along the positive-locking axis 80, in a positive-locking manner with the groove 82 of the locking portion 78 of the gripping element 38.

In this manner, the gripping element 38 is locked to the adapter portion 66. This state of the locking device 68*a* is illustrated in FIG. 3*b*.

The locking element 70*a* has a recess 84 which is arranged centrally in the longitudinal extent. In a release position of the locking element 70*a*, the recess 84 is arranged at the height of the groove 82 of the locking portion 78 of the gripping element 38, cf. FIG. 5*b*. In this state, the locking region 88 is arranged outside the groove 82 of the locking portion 78 of the gripping element 38 so that the positive-locking connection can be released and so that the gripping element 38 can be released along the positive-locking axis 80 from the adapter portion 66.

The locking device 68*a* has a pretensioning element 86 which is preferably in the form of a pressure spring. The pretensioning element 86 is, for example, arranged at an end, which is opposite the unlocking element 76*a*, of the locking element 70*a*. The locking element 70*a* is pretensioned via the pretensioning element 86 along the movement axis 74*a* into the locking position thereof.

The locking device 68*a* further comprises a stop 90 which is securely connected to the adapter portion 66 and which is in the form of a bolt, for example. The stop 90 is particularly orientated transversely relative to the movement axis 74*a* of the locking element 70*a* and projects into the recess 84 of the locking element 70*a*.

The stop 90 is used to limit a movement path of the locking element 70*a* along the movement axis 74*a* and to define the end positions of the locking element 70*a*. In the locking position (cf. FIG. 3*b*) and in the release position (cf. FIG. 5*b*), the stop 90 abuts with different external faces against one of the two end delimitations of the recess 84, respectively.

The gripping apparatus 12 has retention devices 92 which are independent of the locking device 68*a*, 68*b* and which are active between an adapter portion 66, 67 and a gripping element 38, 39.

The retention devices 92 are used to releasably retain the gripping element 38 and 39 on the adapter portion 66 and 67 and prevent the gripping element 38 and 39 from falling from the adapter portion 66 and 67 in an uncontrolled manner in a state in which the locking element 70*a* and 70*b* takes up its release position.

Each retention device 92 has positive-locking elements 94 and 96. For example, the positive-locking elements 94 are in the form of receiving regions which are provided in the adapter portions 66, 67 and which serve to receive positive-locking elements 96 which are in the form of projections and are provided on the gripping elements 38, 39.

The positive-locking elements 94, 96 are constructed in such a manner that each gripping element 38 and 39 is guided along at least one guiding axis 98 on the adapter portion 66 and 67 by means of the positive-locking elements 94, 96. The at least one guiding axis 98 is particularly orientated perpendicularly to the gripping axis 42. In the release position of the locking element 70*a*, 70*b*, the gripping element 38, 39 can be removed from the adapter portion 66, 67 along the guiding axis 98.

Figure 6:
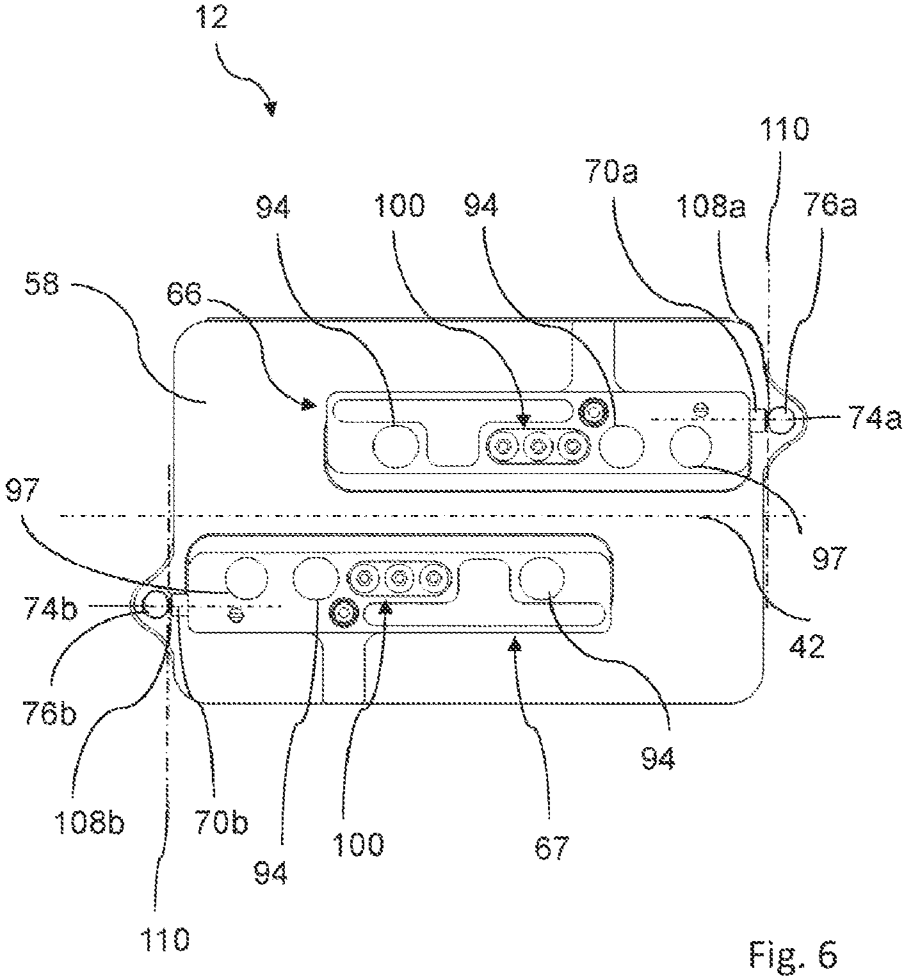
FIG. 6 shows a front view of the gripping apparatus according to FIG. 5*a*, but without any gripping elements.

The adapter portions 66, 67 further have openings 97 for introducing the locking portions 78, cf. FIG. 6.

At least one adapter portion 66, 67 advantageously has at least one reduced pressure connection 100 which communicates with a reduced pressure device (not illustrated in the drawings) of the gripping element 38. The reduced pressure device allows an object to be gripped exclusively by means of reduced pressure. Alternatively, the reduced pressure device allows mechanical gripping of an object to be supported by means of reduced pressure.

The gripping apparatus 12 has a drive unit 102 which is used to drive the adapter portions 66, 67 along the drive axis 42, cf. FIG. 3. The drive unit 102 is particularly arranged inside the base member 58. The drive unit 102 comprises, for example, an electric motor.

The drive unit 102 drives both adapter portions 66 and 67, for example, via a wheel gear mechanism or traction means mechanism, for example, by a toothed rack being arranged on each of the adapter portions 66 and 67, which toothed racks mesh with circumferentially offset portions of a drive wheel of the drive unit 102.

By means of the drive unit 102, both a gripping movement for gripping and releasing an object 44 and an actuation movement for moving the locking devices 68*a* and 68*b* out of a locking position into an unlocking position can be carried out. In the unlocking position, the locking elements 70*a* and 70*b* are each in the release position thereof.

During a gripping movement, the adapter portions 66 and 67 are moved toward each other with the gripping elements 38 and 39; when an object 44 is released and during movement into an unlocking position, the adapter portions 66 and 67 are moved away from each other with the gripping elements 38 and 39.

Optionally, the gripping apparatus 12 has a control device 104. This is illustrated schematically in FIG. 3*a*. The control device 104 is arranged, for example, in the base member 58 and constructed to control the drive unit 102. The movement of the adapter portions 66 and 67 and the gripping elements 38 and 39 along the gripping axis 42 can be controlled with the control device.

Optionally, the gripping apparatus 12 has a monitoring device 106. This device is schematically illustrated in FIG. 3*a*. The monitoring device 106 comprises, for example, a camera system and/or at least one sensor which is in the form, for example, of an inductive, optical and/or capacitive sensor.

The monitoring device 106 monitors a position and/or location of the adapter portions 66, 67 and/or a position and/or location of the locking element 70*a*, 70*b* and/or a presence of the gripping elements 38, 39 on the respective adapter portions 66 and 67.

The monitoring device 106 advantageously communicates with the control device 104. Consequently, the control device 104 can control the drive unit 102 and take into consideration parameters which are detected by the monitoring device 106. In particular, consequently, the gripping of an object 44 and the unlocking of the gripping elements 38 and 39 can be carried out without any monitoring by the operator.

FIGS. 3*a* and 3*b* illustrate the locking device 68*a* in a state in which the locking element 70*a* takes up a locking position. On this basis, FIGS. 4*a* and 4*b* and FIGS. 5*a* and 5*b* illustrate states which the locking device 68*a* takes up during the movement of the locking element 70*a* into the release position thereof, starting from the beginning of an actuation movement (cf. FIGS. 4*a* and 4*b*) up to the end of the actuation movement (cf. FIGS. 5*a* and 5*b*).

Figure 4A:
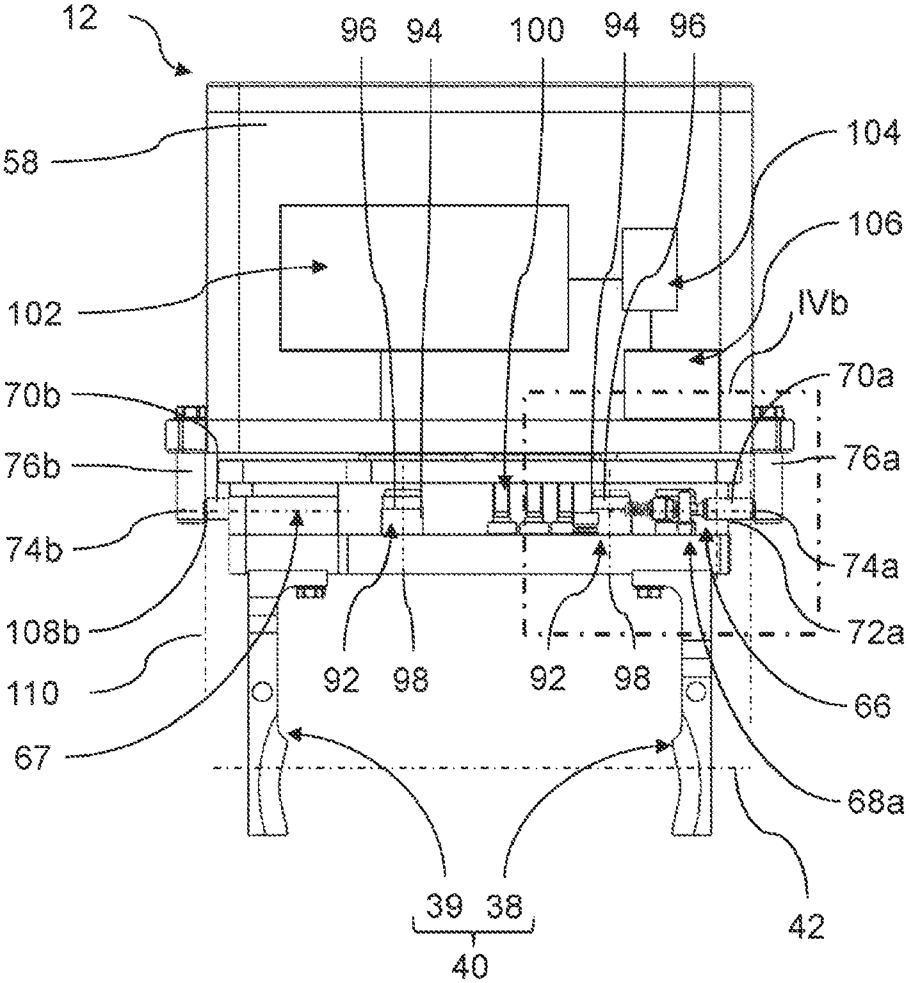
FIG. 4*a* shows a plan view corresponding to FIG. 3, wherein the gripping elements are depicted in an additional open gripping position, which can still just be used.
Figure 4B:
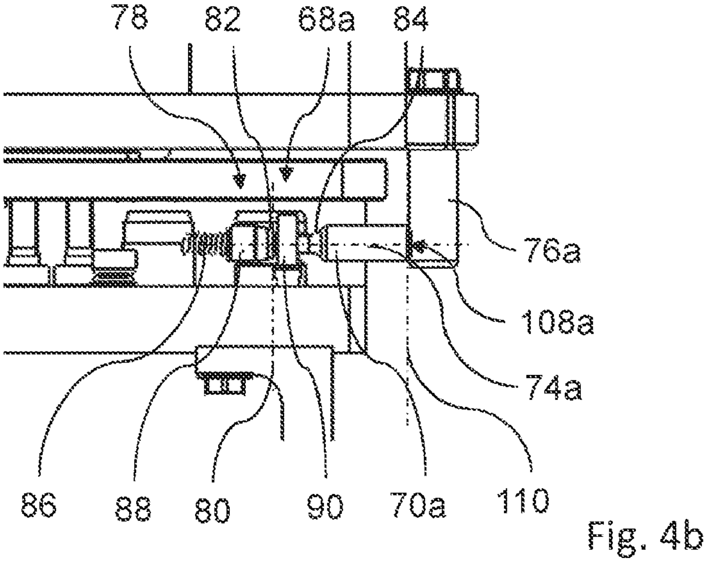
FIG. 4*b* shows a cutout, which is denoted IVb in FIG. 4*a*, as an enlarged illustration.

In order to move the locking devices 68*a* and 68*b* into the respective unlocking position, the adapter portions 66 and 67 are driven via the drive unit 102 and moved apart from each other along the gripping axis 42. In FIGS. 4*a* and 4*b*, the adapter portions 66, 67 take up with the locking elements 70*a*, 70*b* positions in which end faces 108*a*, 108*b*, which project out of the adapter portions 66 and 67, of the locking elements 70*a*, 70*b* contact the associated unlocking elements

76*a*, 76*b*, respectively. Preferably, the contact is carried out without transverse force within actuation planes 110 which are orientated perpendicularly to the gripping axis 42.

In the state according to FIGS. 4*a* and 4*b*, the locking elements 70*a*, 70*b* are still in the locking position. The state according to FIGS. 4*a* and 4*b* corresponds to a maximum usable spacing, for a gripping operation, of the gripping elements 38, 39.

If the adapter portions 66, 67 are driven in such a manner that they move from the state according to FIGS. 4*a* and 4*b* further in the direction toward the unlocking elements 76*a*, 76*b*, the respective contacts of the locking elements 70*a*, 70*b* with the associated unlocking elements 76*a*, 76*b* cause the locking elements 70*a*, 70*b* no longer to move together with the adapter portions 66, 67, but instead along the movement axes 74*a*, 74*b* thereof—counter to the movement direction of the adapter portions 66, 67—into the adapter portions 66, 67. In this manner, the locking elements 70*a*, 70*b* are moved into the respective release position thereof. The maximum movement path of the locking elements 70*a*, 70*b* is defined by the stop 90, as already explained above.

After a contact of the locking elements 70*a*, 70*b* with the respective unlocking elements 76*a*, 76*b* has been brought about from a spacing, during the movement of the locking elements 70*a*, 70*b* into the respective release position thereof no relative movement takes place any more between the locking elements 70*a*, 70*b* and the associated unlocking element 76*a*, 76*b*. Friction and material abrasion are thereby avoided, which is particularly advantageous for using the gripping apparatus 12 in an aseptic environment.

During the movement of the locking elements 70*a* and 70*b* into the respective release position thereof, the pretensioning elements 86 are further compressed counter to the direction of the respective pretensioning force thereof.

Figure 5A:
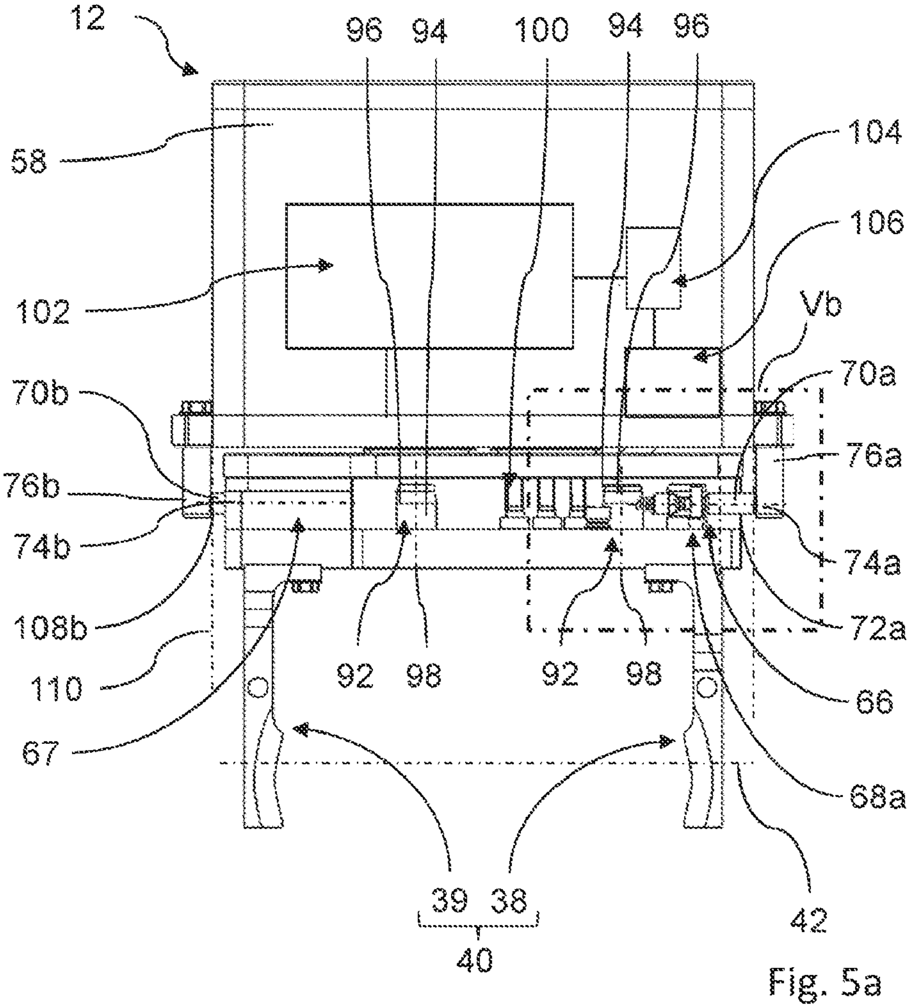
FIG. 5*a* shows a plan view corresponding to FIG. 4*a*, wherein the gripping elements are further opened by an actuation path of a locking device of the gripping apparatus.
Figure 5B:
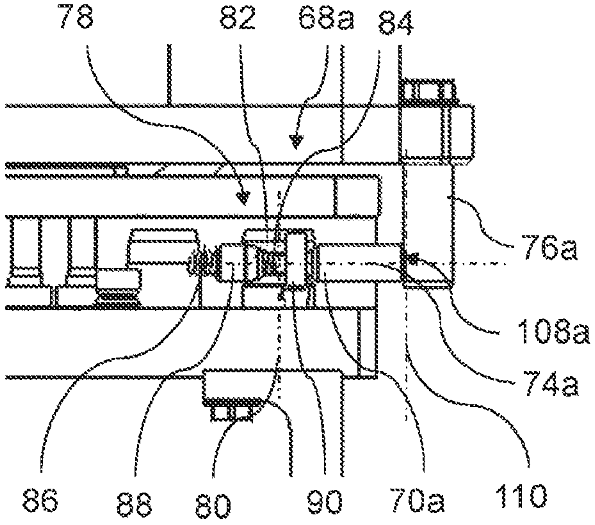
FIG. 5*b* shows a cutout, which is denoted Vb in FIG. 5*a*, as an enlarged illustration.

In the release position of the locking elements 70*a*, 70*b*, the locking devices 68*a*, 68*b* take up the unlocking position thereof, cf. FIGS. 5*a* and 5*b*. The gripping elements 38, 39 are unlocked in this unlocking position and can be released from the adapter portions 66, 67 or initially still retained at that location, using the retention devices 92.

Optionally, the robot 14 brings the gripping elements 38, 39 of the first gripping element pair 40 to the store 46, for example, to a free storage portion 50*a* of the store 46.

The robot 14 can subsequently take up the gripping elements of a second gripping element pair 41 from the other storage portion 50*b* and there initially—using the retention devices 92—continue to retain them in a releasable manner.

If the drive unit 102 then moves the adapter portions 66, 67 out of the unlocking position again, however, the pretensioning elements 86 move the locking elements 70*a* and 70*b* into the respective locking position thereof so that a state, which is illustrated, for example, in FIGS. 4*a* and 4*b*, is reached again.

In the exemplary embodiment illustrated in the drawings, the gripping apparatus 12 is in the form of an external gripper. It will be understood that the gripping apparatus 12 can also be in the form of an internal gripper.

What is claimed is:

1. A gripping apparatus (12) comprising a base member (58) which is configured to connect to a robot (14), at least one adapter portion (66, 67) which is movable on the base member (58) along a gripping axis (42), and at least one gripping element (38, 39) which is configured to be releasably locked on the adapter portion (66, 67), wherein the adapter portion (66, 67) comprises a locking device (68*a*, 68*b*) having at least one locking element (70*a*, 70*b*) which locks the gripping element (38, 39) to the adapter portion (66, 67) in a locking position, wherein the locking device (68*a*, 68*b*) is configured to move along the gripping axis (42) into an unlocking position in which the locking element (70*a*, 70*b*) is configured to move out of the locking position into a release position, in which the gripping element (38, 39) is configured to release from the adapter portion (66, 67), wherein the gripping apparatus (12) has a drive unit (102) for driving the at least one adapter portion (66, 67) and the at least one gripping element (38, 39) along the gripping axis (42) in such a manner that the locking device (68*a*, 68*b*) is configured to move into the unlocking position, wherein an unlocking element (76*a*, 76*b*) is arranged on the base member (58), and wherein the unlocking element (76*a*, 76*b*) in the unlocking position of the locking device (68*a*, 68*b*) contacts the locking element (70*a*, 70*b*) and moves the locking element (70*a*, 70*b*) out of the locking position into the release position.

2. The gripping apparatus (12) as claimed in claim 1, wherein the gripping apparatus (12) has a monitoring device (106) which monitors a location and/or position of the adapter portion (66, 67) and/or a location and/or position of the locking element (70*a*, 70*b*) and/or a presence of a gripping element (38, 39) on the adapter portion (66, 67).

3. The gripping apparatus (12) as claimed in claim 2, wherein the gripping apparatus (12) comprises a control device (104), wherein the control device (104) is configured to control the drive unit (102) and/or the monitoring device (106).

4. The gripping apparatus (12) as claimed in claim 1, wherein the unlocking position of the locking device (68*a*, 68*b*) corresponds to an end or reversal position of the adapter portion (66, 67) along the gripping axis (42).

5. The gripping apparatus (12) as claimed in claim 1, wherein the locking device comprises a pretensioning element which urges the locking element into the locking position.

6. The gripping apparatus (12) as claimed in claim 1, wherein the locking device (68*a*, 68*b*) has at least one stop (90) which is arranged on the base member (58) and which limits a movement path of the locking element (70*a*, 70*b*).

7. The gripping apparatus (12) as claimed in claim 1, wherein the locking element (70*a*, 70*b*) is configured to move during a movement between the locking position and the release position along a movement axis (74*a*, 74*b*) which is orientated parallel with the gripping axis (42).

8. The gripping apparatus (12) as claimed in claim 1, wherein the locking element (70*a*, 70*b*) cooperates with a locking portion (78) which is associated with the gripping element (38, 39), wherein the locking element (70*a*, 70*b*) and the locking portion are connected to each other in a positive-locking manner in the locking position of the locking element (78), wherein the positive-locking connection is active along a positive-locking axis (80) which extends at an angle to the gripping axis (42).

9. The gripping apparatus (12) as claimed in claim 8, wherein the positive-locking axis (80) extends perpendicularly to the gripping axis (42).

10. The gripping apparatus (12) as claimed in claim 1, wherein the gripping apparatus (12) has at least one retention device (92) which is independent of the locking device (68*a*, 68*b*) for retaining the at least one gripping element (38, 39) on the at least one adapter portion (66, 67), wherein the retention device (92) has positive-locking elements (94, 96) which are associated with the gripping element (38, 39) and the adapter portion (66, 67) and which are positive-locking with respect to each other along the gripping axis (42) in a state thereof joined together.

11. The gripping apparatus (12) as claimed in claim 10, wherein the positive-locking elements (94, 96) comprise a first positive-locking element (94) which has a receiving region for receiving a projection which is formed on or by a second positive-locking element (96).

12. The gripping apparatus (12) as claimed in claim 1, wherein the adapter portion (66, 67) has at least one reduced pressure connection (100) which communicates with a reduced pressure device of the gripping element (12).

13. The gripping apparatus (12) as claimed in claim 1, wherein the unlocking element (76*a*, 76*b*), when the base member (58) is connected to a robot (14), follows a handling movement of the robot (14).

14. The gripping apparatus (12) as claimed in claim 1, wherein the unlocking element (76*a*, 76*b*) is arranged in a non-movable manner on the base member (58) and/or wherein the unlocking element (76*a*, 76*b*) is independent of a movement of the adapter portion (66, 67) relative to the base member (58).

15. The gripping apparatus (12) as claimed in claim 1, wherein the at least one gripping element (38, 39) includes two gripping elements (38, 39) which form a gripping element pair (40), wherein the two gripping elements (38, 39) are configured to be releasably locked to respective adapter portions (66, 67) of at least one adapter portion (66, 67) of the base member (58) and the two gripping elements (38, 39) are configured to be moved along the gripping axis (42) in mutually opposite directions.

16. A system (10) comprising a gripping apparatus (12) as claimed in claim 15, wherein the gripping element pair (40) is a first gripping element pair (40) and the gripping apparatus (12) includes a second gripping element pair (41), a store (46), and a robot (14), wherein the base member (58) of the gripping apparatus (12) is arranged on an active region (36) of the robot (14).

17. The system as claimed in claim 16, wherein the store (46) has storage portions (50*a*, 50*b*) which are each constructed to store respective ones of the first and second gripping element pairs (40, 41).

18. The system as claimed in claim 17, wherein in a state of the first or second gripping element pair (40, 41) being stored on the respective one of the storage portions (50*a*, 50*b*), the first or second gripping element pair (40, 41) is retained in or on the store (46) in a positive-locking manner.

19. The system (10) as claimed in claim 16, wherein the first gripping element pair (40) or the second gripping element pair (41) is releasably locked to the adapter portions (66, 67) of the base member (58) and wherein an other gripping element pair of the first gripping element pair (40) and the second gripping element pair (41) is stored in the store (46).

* * * * *